United States Patent
Krzanowski et al.

(10) Patent No.: US 9,261,377 B2
(45) Date of Patent: Feb. 16, 2016

(54) ROUTE SELECTION

(71) Applicant: Verizon Patent and Licensing Inc., Arlingon, VA (US)

(72) Inventors: Roman Krzanowski, White Plains, NY (US); Yvonne C. Parsons, Wheat Ridge, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/308,375

(22) Filed: Jun. 18, 2014

(65) Prior Publication Data

US 2014/0303891 A1    Oct. 9, 2014

Related U.S. Application Data

(63) Continuation of application No. 13/274,405, filed on Oct. 17, 2011, now Pat. No. 8,768,623.

(51) Int. Cl.
*G01C 21/34* (2006.01)
*G01C 21/36* (2006.01)
*G01C 21/00* (2006.01)

(52) U.S. Cl.
CPC ............ *G01C 21/3617* (2013.01); *G01C 21/34* (2013.01); *G01C 21/3492* (2013.01); *G01C 21/00* (2013.01); *G01C 21/3407* (2013.01); *G01C 21/3626* (2013.01); *G01C 21/3661* (2013.01)

(58) Field of Classification Search
CPC ........ G01C 21/00; G01C 21/26; G01C 21/34; G01C 21/3453; G01C 21/3461; G01C 24/3484
USPC ......... 701/400–418, 423, 425, 450, 487, 511, 701/533, 537, 538, 540, 541
See application file for complete search history.

(56) References Cited

U.S. PATENT DOCUMENTS

| | | | |
|---|---|---|---|
| 6,389,356 B1 | 5/2002 | Onishi | |
| 6,701,250 B1 * | 3/2004 | Rychlak | 701/414 |
| 6,944,533 B2 | 9/2005 | Kozak et al. | |
| 7,671,764 B2 | 3/2010 | Uyeki et al. | |
| 8,321,125 B2 | 11/2012 | Tengler et al. | |
| 8,515,674 B2 * | 8/2013 | Babetski | 701/533 |
| 8,768,623 B2 * | 7/2014 | Krzanowski et al. | 701/533 |
| 2002/0120396 A1 * | 8/2002 | Boies et al. | 701/209 |
| 2004/0102898 A1 * | 5/2004 | Yokota et al. | 701/210 |
| 2006/0053038 A1 | 3/2006 | Warren et al. | |
| 2006/0173841 A1 * | 8/2006 | Bill | 707/6 |
| 2008/0046134 A1 | 2/2008 | Bruce et al. | |
| 2009/0216435 A1 * | 8/2009 | Zheng et al. | 701/209 |
| 2009/0281850 A1 | 11/2009 | Bruce et al. | |
| 2009/0292462 A1 * | 11/2009 | Babetski | 701/201 |
| 2009/0319180 A1 | 12/2009 | Robinson et al. | |
| 2010/0070171 A1 | 3/2010 | Barbeau et al. | |
| 2010/0211300 A1 | 8/2010 | Jaffe et al. | |
| 2010/0332113 A1 | 12/2010 | Tengler et al. | |

(Continued)

*Primary Examiner* — Thomas Tarcza
*Assistant Examiner* — Tyler J Lee

(57) ABSTRACT

A request is received to compute a route from a start point to an end point. The route is computed using map data that includes a plurality of map elements, and route data that includes rules associated with the map elements, each of the rules being triggered by a condition flag that specifies a condition according to which the rule should be applied. The route data is based inputs related to driver experience in a geographic area associated with the route, and the inputs are based on stored data and not real-time or near-real-time data.

21 Claims, 4 Drawing Sheets

(56) References Cited

U.S. PATENT DOCUMENTS

| | | | |
|---|---|---|---|
| 2011/0153193 A1* | 6/2011 | Fox et al. | 701/201 |
| 2011/0231086 A1 | 9/2011 | Montealegre et al. | |
| 2012/0158299 A1 | 6/2012 | Cerecke et al. | |
| 2012/0253661 A1 | 10/2012 | Tuukkanen | |
| 2013/0317746 A1* | 11/2013 | Babetski | 701/537 |

* cited by examiner

ROUTE SELECTION

CROSS REFERENCE TO RELATED APPLICATIONS

This application is a continuation of U.S. patent application Ser. No. 13/274,405, filed on Oct. 17, 2011, now U.S. Pat. No. 8,768,623, Issued on Jul. 1, 2014, the contents of which are hereby incorporated by reference in its entirety.

BACKGROUND INFORMATION

A geographic information system (GIS) provides geographic data. Accordingly, a GIS may include data relating to roads, streets, highways, intersections, etc. in a geographic area. Various devices and applications may make use of GIS data. For example, map applications, global positioning system (GPS) devices, etc., may use GIS data to determine an appropriate route between endpoints. Such routing is often performed using a shortest-distance methodology. That is, a routing application analyzes the GIS data and recommends a route that is the shortest distance between a starting point and a destination point. In some cases, a routing application may take other factors into account, such as a user's desire to avoid highways. However, routing applications are generally limited in their ability to consider other information. For example, drivers who regularly traverse a geographic area have a wealth of information about routes and route segments in a geographic area that is generally not considered by routing applications. Present routing applications may select routes that are very different from routes selected by such drivers based on their experience and knowledge.

DETAILED DESCRIPTION OF PREFERRED EMBODIMENTS

Figure 1:
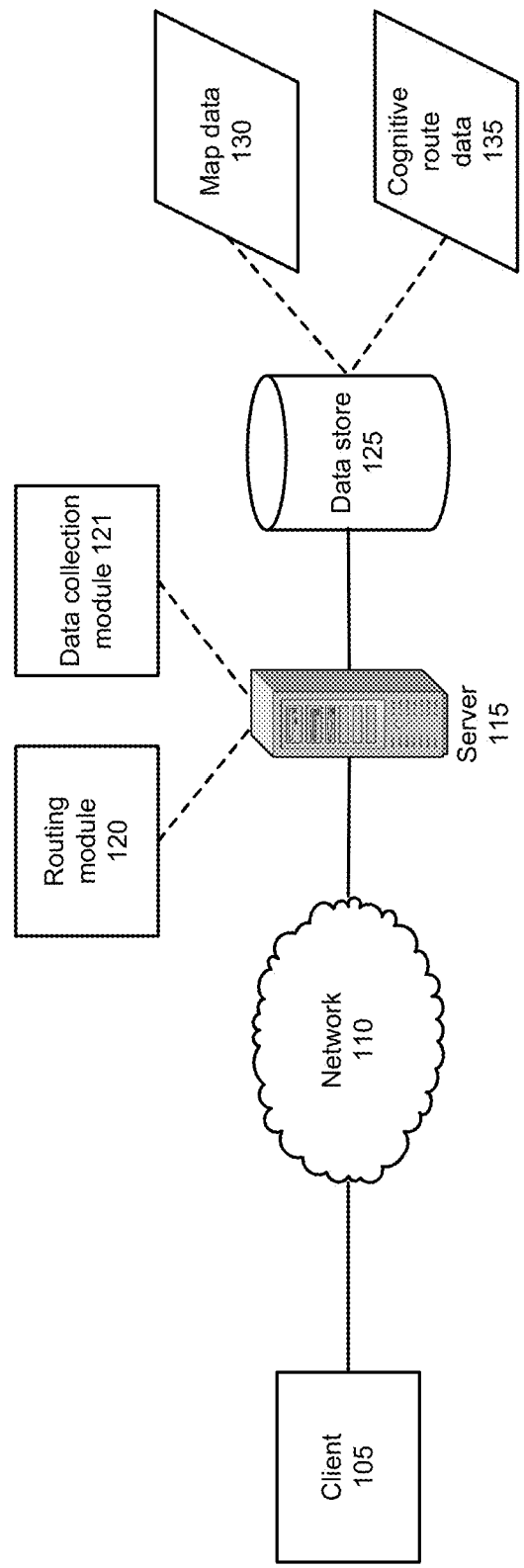
FIG. 1 illustrates an exemplary system for using route information.

FIG. 1 illustrates an exemplary system 100 for collecting, generating, and using route data. As used herein, the term "route data" refers to information about elements in a geographic area gathered from sources, e.g., drivers, with particular knowledge about the geographic area, devices that traverse routes in an area, etc. Examples of route data include information and/or rules such as the following:

- On weekdays (Monday through Friday) intersection A is typically congested.
- On weekdays (Monday through Friday) avoid intersection A.
- During heavy rains, avoid street A between cross-streets B and C due to a likelihood of flooding.
- Due to the location of a stadium or other arena, during events street A between cross streets B and C is typically impassable.
- From northbound highway A, take exit B to get to street D on weekdays between the hours of 6 AM and 8 PM, but at all other times take exit C.
- During months when snow is possible (November through April), avoid street A.
- During weekdays between 6 AM and 10 AM, avoid street A going eastbound.
- Street A is always faster than street B to get to intersection C.
- etc.

The system 100 includes one or more client devices 105 that communicate with a server 115, e.g., via one or more networks 110. The server 115 generally includes a routing module 120 for computing and providing to client 105 routes based on data included in a data store 125. The server 115 may also include a data collection module 121. The data included in the data store 125 may include map data 130 as well as route data 135. The data collection module 121 may be used to collect data such as route data 135.

A client device 105 may be any one of a variety of computing devices, such as a desktop computer, laptop computer, tablet computer, smart phone, personal digital assistant, global positioning system (GPS) device, etc. In some cases, a client 105 may access server 115 via a conventional web browser, but client 105, e.g., in cases where client 105 is a GPS device, may also access server 115 via a specialized application. As discussed further below, a client 105 may be used for gathering route data 135, as well as for receiving map data 130 and route suggestions from server 115.

Network 110 is generally a packet network, and may incorporate one or more of a cellular network, the Internet, a wide area network, a local area network, etc.

Server 115 may be a general-purpose computing device including are connected to a non-volatile memory that includes routing module 120, data collection module 121, and generally other instructions that may be executed by one or more processors of the server 115. As mentioned above, routing module 120 uses map data 130, and also route data 135, to provide routes requested by a client 105. In some implementations, server 115 may actually represent a plurality of computer devices, e.g., computer servers working in a distributed configuration.

Data collection module 121 may include instructions for providing a user interface such as a graphical user interface (GUI), e.g., a webpage or the like, to a client 105 to gather route data 135. Such user interface may provide a form or the like requesting user input concerning elements of map data 130; examples of elements of map data 130 are discussed below, e.g., with respect to FIG. 3. For example, as discussed further below, data collection module 121 may request that users identify elements of map data 130 having attributes derived from users' knowledge and experience (e.g., avoid the map element at a certain time of day, during certain events or weather conditions, etc.).

Data store 125 may be a relational database or the like included within server 115 or, more likely, within one or more separate computing devices in communication with server 115. Map data 130 included in the data store 125 may be what is sometimes referred to as global information service (GIS) data. Accordingly, map data 130 may be stored in one or more formats, such as raster data, vector data, etc. Map data 130 may be acquired from a variety of sources, e.g., from vendors for GIS data.

Figure 3:
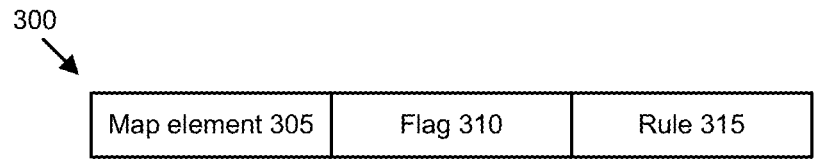
FIG. 3 illustrates an exemplary format for storing route data.

Route data 135, also included in the data store 125, may be stored in a variety of formats, including as illustrated in FIG. 3, discussed below. As explained above, route data 135 generally includes a set of one or more rules associated with one or more elements of map data 130. Accordingly, when routing module 120 calculates a route from a start point to an endpoint using map data 130, module 120 may apply one or more rules from route data 135 to elements in the map data 130 to determine the recommended route. Route data 135 may be gathered by data collection module 121 or some similar mechanism for collecting the data 135 and storing it in the data store 125.

Figure 2:
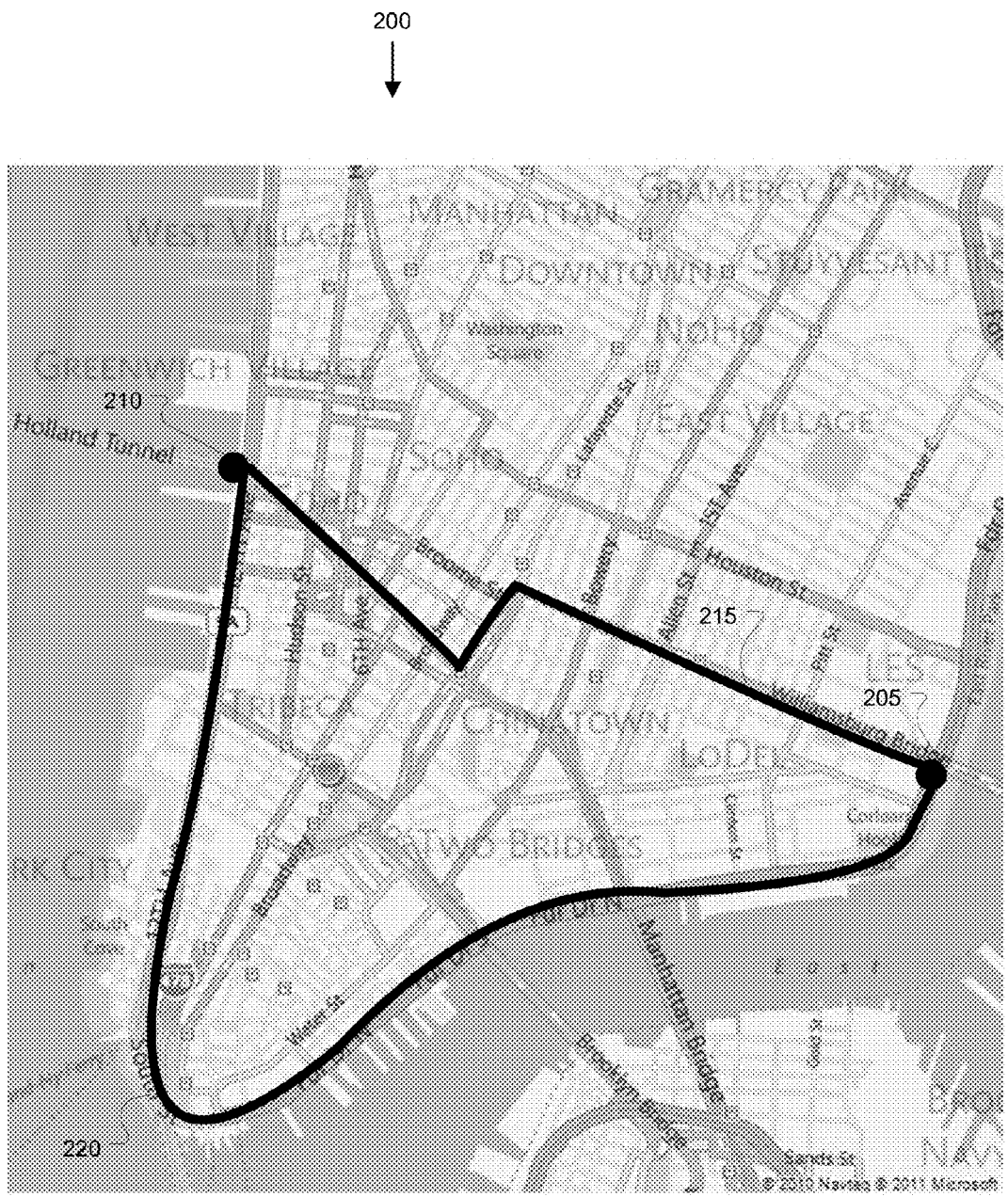
FIG. 2 illustrates an exemplary use of route data.

FIG. 2 illustrates an exemplary use of route data 135. FIG. 2 shows a representation 200 of a geographic area, in this case, a map of the southern portion of Manhattan in New York, N.Y. Assume that a client 105 has requested that server 115 provide a route from a start point 205 to an endpoint 210. Absent route data 135, routing module 120 would take a shortest-distance approach and computes a route 215. However, using route data 135, the routing module 120 would recognize that using highways, rather than city streets, would present the most efficient route from the point 205 to the point 210, and would compute the route 220.

FIG. 3 illustrates an exemplary format for storing route data 135. FIG. 3 shows a route data 135 data record 200 that includes a map element 305, a condition flag 310, and a rule 315. The map element 305 may include information specifying a feature on a map, e.g., a road, street, highway, intersection, bridge, building, landmark, etc. as would be conventionally stored in GIS data, e.g., with latitude and longitude coordinates or other court in data.

Condition flag 310 includes data specifying a condition under which a rule 315 should be applied. For example, a condition flag 310 may specify one or more of a day of the week, a time or times of day, a time of year, a direction of travel (e.g., northbound, southbound, etc.), a weather condition, the existence of an event, etc.

A rule 315 may be applied by routing module 120 to map elements for a geographic area 200 when computing a route 215. For example, if a condition flag 310 specifies that a time of day triggers a rule 315 for a map element 305, the routing module 120 will apply the rule 315 when considering the map element 305 for a route at a time of day specified by the condition flag 310. For example, the map element 305 could be a segment of a street, the time of day could be from 6 AM to 10 AM, and the rule 315 could be to avoid the specified street segment. Then, if the routing module 120 has requested to compute a route at 8 AM where the specified street segment is considered for inclusion in the route, according to the rule 315 the route cannot include the specified street segment.

In general, a map element 305 may be associated with more than one flag 310 and more than one rule 315. For example, different flags 310 associated with a map element 305 may represent different conditions, e.g., time of day conditions, weather conditions, event conditions, etc. Likewise, different rules 315 associated with a map element 305 may be triggered by different flags 310. For example, a rule 315 to avoid a map element 305 could be associated with an event flag 310, whereas a rule 315 to use the map element 305 could be associated with a time of day flag 310. Moreover, rules 315 may specify precedence over one another. Continuing the previous example, a rule 315 to avoid a map element 305 during events could take precedence over a rule 315 to use a map element 305 at a time of day.

Figure 4:
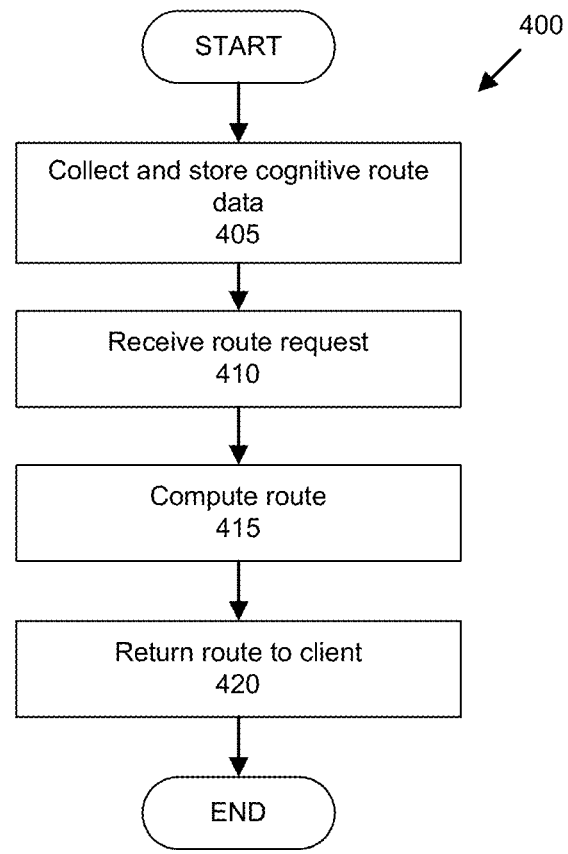
FIG. 4 illustrates an exemplary process for collecting and using route data.

FIG. 4 illustrates an exemplary process 400 for collecting and using route data 135.

The process 400 begins in a step 405, in which server 115 collects, and stores in data store 125, route data 135. For example, as mentioned above, server 115 could include a data collection module 121 or other set of computer-executable instructions for collecting the data 135.

One implementation of data collection module 121 provides a web page or the like in which elements of map data 130, e.g., street segments, are listed. In association with each element 305 of map data 130, a drop-down box or the like is provided with possible options for a user to select. Such options may include "no rule," "avoid at specified times of day," "avoid at specified dates," "avoid during specified weather conditions," "avoid during specified events," etc. Selection of one of these options may cause the user to be prompted for further information. For example, if the user selects "avoid at specified times of day," the module 121 may then prompt the user to specify the times of day during which the element 305 of map data 130 should be avoided.

Further, module 121 may allow a user to associate more than one rule 315 with an element 305 of map data 130. For example, in some implementations, a user may select to avoid the element 305 at specified times of day as well as during specified events, etc.

The module 121 generally includes instructions for transmitting route data 135 from a client 105 to the server 115. For example, module 121 may provide a hypertext markup language (HTML) form to the client 105, and form data including route data 135 may be submitted to server 115.

It is to be understood that alternative configurations of the data collection module 121, and alternatives to collecting route data 135 via the module 121, are possible. For example, data collection module 121 could be configured to collect data from clients 105 used in vehicles. In this example, a client 105 could be a GPS device with a non-volatile memory storing instructions executable by a processor in the device to track changes in location and to provide data for collection by the data collection module 121. The module 121 could thus, for a set of endpoints A and B, collect information concerning travel times of different routes between the endpoints. Accordingly, instead of a user providing information to data collection module 121 such as travel times related to a certain map element 305 being long at certain times of day, such information could be inferred from data collected from clients 105.

For example, data collection module 121 could receive data concerning travel times related to a certain map element 305, e.g., a road segment, from a plurality of clients 105. From this data, the module 121 could determine that travel times for the road segment on certain evenings averaged twice what travel times averaged for the road segment on other evenings. The module 121 could further correlate the evenings with long travel times to events at a venue on the road segment. Thus, the module 121 could generate a flag 310 and rule 315 to be associated with the map element 305 and stored in data store 125. The flag 310 would be for events occurring at the venue on the road segment, and the rule 315 would be to avoid the map element 305 (i.e., the road segment) when the flag was triggered.

Further, implementations are possible in which data collection module 121 is bypassed or not included at all. For example, route data 135 could be collected by surveying or interviewing drivers in a geographic area. For example, drivers could provide information about various intersections, highways, landmarks etc. at different times of day, under different weather conditions, in association with events, etc. Then, a user of server 115 could, e.g. via interface provided by data collection module 121, or by providing data to data store 125 via some other mechanism, enter route data 135 into the data store 125.

It is to be understood that the collection module 121 could obtain data 135 by a combination of mechanisms. For example, user inputs to a web page could be combined with data transmitted by clients 105 without user intervention and/or also data obtained by interviewing users and entering the data 135 into data store 125 as discussed above. In general, a variety of mechanisms can be used by collection module 121, the collection module 121 generally does not collect route data 135 on a real-time or near-real-time basis (i.e., data that is only minutes or hours old). For example, route data 135 is not based on real-time or near real-time data such as traffic data. Instead, route data 135 is generally based on stored data, sometimes referred to as historical data, that has been collected over a period of time, e.g., days, weeks, or months, and reflects driving experiences over the period of time.

Returning to the process 400, next, at step 410, server 115 receives a route request from a client 105. For example, client 105 could submit a route request from a webpage that provides a map application, or client 105 could be a GPS device submitting a route request, etc. Alternatively, client 105 could be a GPS device that included map data 130 and route data 135, as well as a routing module 120. For example, the routing module 105 could be installed on client 105 and map data 130 and data 135 could be provided periodically from data store 125 or some other source. In this case, step 410 would essentially comprise the routing module 120 being invoked within the client 105, e.g., according to a request received via a user interface.

Figure 5:
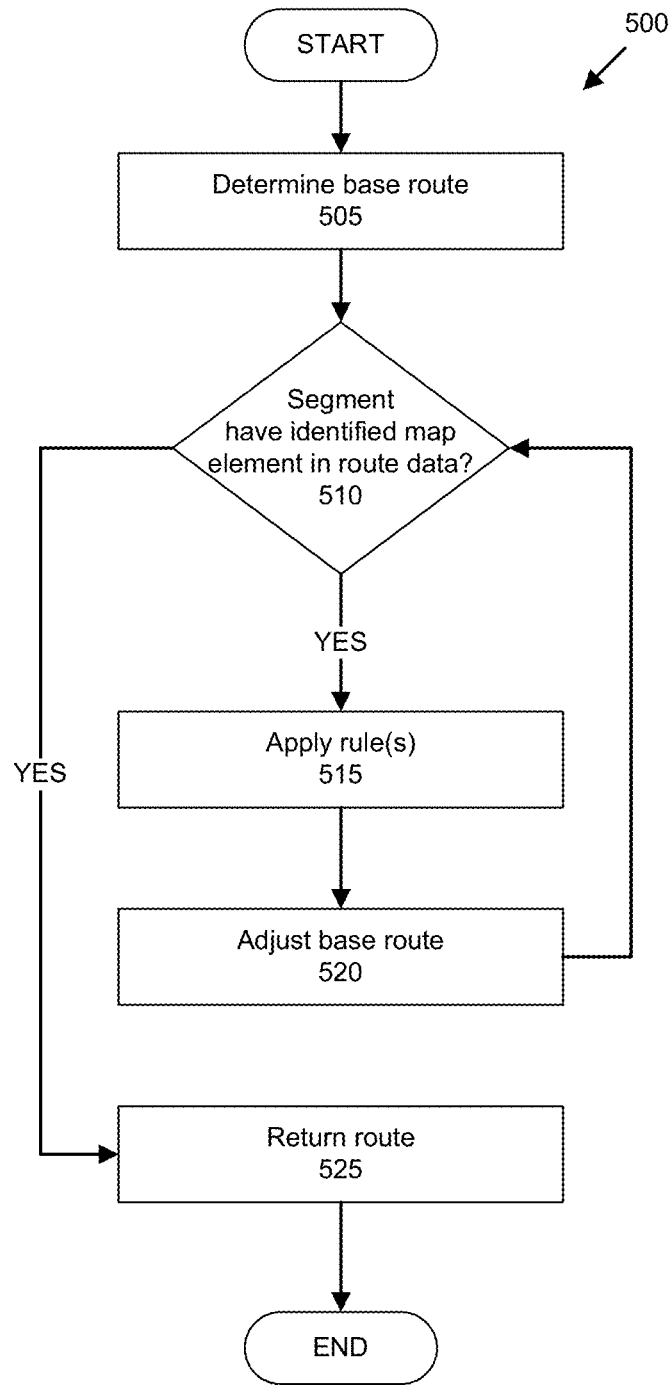
FIG. 5 illustrates an exemplary process for applying cognitive route rules to a base routing methodology.

Next, in step 415, routing module 120 in server 115 computes a route in response to the route request received in step 410. The route is computed according to map data 130 as well as data 135. For example, a base routing methodology, such as a shortest-distance methodology, may be used, with route data 135 applied to segments of a route determined by the routing methodology such that certain map elements 305 that may have otherwise been included in the route will be excluded because a flag 310 associated with the map element 305 triggers a rule 315 that causes such exclusion, e.g., because the route has requested a particular time of day, time of year, in particular weather conditions, etc. Conversely, a map element 305 that would have otherwise been excluded from the route may be included according to a rule 315. For example, a rule 315 associated with the map element 305 could specify that travel times associated with the map element are very fast at a particular time of day, causing routing module 120 to include the map element 305 in the route. FIG. 5, discussed below, illustrates an exemplary process for applying cognitive route rules to a base routing methodology.

Alternatively, implementations are possible in which a base routing methodology, e.g., a shortest-distance methodology, is not be used. The routing methodology in such implementations may be referred to as a "pure" cognitive routing methodology because it applies route data 135 to map data 130 without any other inputs or rules. That is, a pure cognitive routing methodology stores map elements 305 representing a starting point and an ending point. Then, when a route from the starting point to the ending point is requested as described above with respect to step 410, the routing module 120 provides a route according to one or more rules 315 associated with the map element 305.

Following step 415, next, in step 420, routing module 120 causes the route computed in step 415 to be returned to the requesting client 105 via network 110. Of course, step 420 may be different if routing module 120 is executed on the client 105 as described above. In this case, step 420 would essentially comprise the routing module 120 providing the computed route to a display, e.g., a GUI, of a client 105.

Following step 420, the process 400 ends.

FIG. 5 illustrates an exemplary process 500 for applying cognitive route rules to a base routing methodology.

The process 500 begins in a step 505, in which a base route is determined, e.g., according to map data 130 and inputs received by routing module 120 such as a starting point and an ending point for the base route.

Next, in step 510, the routing module 120 determines whether a segment can be identified in the base route that includes a map element 305 in route data 135. Generally, routing module 120 makes this determination by proceeding from the starting point of the base route to the endpoint of the base route. If prior iterations of the process 500 have occurred, then for purposes of step 510, the starting point of the base route is the ending point of the last segment of the base route that was processed.

If no route data 135 is identified in step 510, i.e., no map element 305 pertains to any segments of the base route, or if prior iterations of the process 500 have applied step 510 to all segments of the base route, then the process 500 proceeds to step 525. However, if the module 120 does identify a segment having associated map element 305 from route data 135, then the processing of step 510 ceases without moving on to further segments of the base route, in the process 500 proceeds to step 515.

In step 515, the module 120 uses flags 310 associated with each of the one or more map elements 305 identified in step 510 to apply rules 315 applicable to the map elements.

Next, in step 520, the routing module 120 adjusts the base route according to the rules 315 applied in step 515. For example, for a segment identified in step 510, the path from a starting point of the segment to an ending point of the segments may be adjusted according to rules applied in step 515. Following step 520, the process 500 returns to step 510.

Next, in step 525, the routing module 120 returns the base route to a requester, e.g., as described above with respect to step 420 of the process 400.

Following step 525, the process 500 ends.

Computing devices such as client 105 and server 115 may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. Computing devices in general may include any one of a number of computing devices, including, without limitation, a computer workstation, a desktop, notebook, laptop, or handheld computer, or some other computing device.

Computing devices such as computer 110, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
specifying, by a user input with a computing device having a processor and a memory, a route rule in advance of first and second conditions relative to a plurality of map elements, the route rule being specified based on stored data, that is not real-time data, representing multiple driver experiences and including user knowledge associated with a geographic area and obtained over a period of time;
presenting to a user, through a user interface, the plurality of map elements associated with the geographic area;
receiving a selection of at least one of the plurality of map elements from the user;
generating, based on an occurrence of the conditions, a route based in part on the route rule and the selected one of the plurality of map elements; and
providing, through the user interface, the route to the user.

2. The method of claim 1, further comprising:
providing a form on the user interface requesting form data regarding the plurality of map elements; and
communicating the form data to a server.

3. The method of claim 1, wherein the period of time includes at least one of days, weeks, and months.

4. The method of claim 1, wherein the driver experiences are from a plurality of user devices associated with the geographic area.

5. The method of claim 1, wherein the route rule is specified for a certain time of day based on the driver experiences.

6. The method of claim 1, wherein the route rule includes avoiding at least one map element during a specified event at a venue based on the multiple driver experiences.

7. The method of claim 1, wherein the route rule includes instructions to avoid at least one map element during a weather condition based on the multiple driver experiences.

8. A non-transitory computer-readable medium tangibly embodying computer-executable instructions, comprising instructions that, when executed by a processor, cause the processor to:
specify, by a user input, a route rule in advance of first and second conditions relative to a plurality of map elements, the route rule being specified based on stored data, that is not real time data, representing multiple driver experiences and including user knowledge associated with a geographic area and obtained over a period of time;
present to a user the plurality of map elements associated with the geographic area;
receive a selection of at least one of the plurality of map elements;
generate, based on an occurrence of the conditions, a route based in part on the route rule and the selected one of the plurality of map elements; and
provide the route to the user.

9. The medium of claim 8, the instructions further comprising:
provide a form to the user requesting form data regarding the plurality of map elements; and
communicate the form data to a server.

10. The medium of claim 8, wherein the period of time includes at least one of days, weeks, and months.

11. The medium of claim 8, wherein the driver experiences are from a plurality of sources.

12. The medium of claim 8, wherein the route rule is specified for a certain time of day based on the driver experiences.

13. The medium of claim 8, wherein the route rule includes instructions to avoid at least one map element during a specified event based on the multiple driver experiences.

14. The medium of claim 8, wherein the route rule includes instructions to avoid at least one map element during a weather condition based on the multiple driver experiences.

15. A system, comprising:
a computing device with a processor and a memory, the processor being configured to:
specify, by a user input, a route rule in advance of first and second conditions relative to a plurality of map elements, the route rule being specified based on stored data that is not real-time data, representing multiple driver experiences and including user knowledge associated with a geographic area and obtained over a period of time;
present to a user the plurality of map elements associated with the geographic area;
receive a selection of at least one of the plurality of map elements;
generate, based on an occurrence of the conditions, a route based in part on the route rule and the selected one of the plurality of map elements; and
provide the route to the user.

16. The system of claim 15, the processor further configured to:
provide a form to the user requesting form data regarding the plurality of map elements; and
communicate the form data to a server.

17. The system of claim 15, wherein the period of time includes at least one of days, weeks, and months.

18. The system of claim 15, wherein the driver experiences are from a plurality of user devices associated with the geographic area.

19. The system of claim 15, wherein the route rule is specified for a certain time of day based on the driver experiences.

20. The system of claim 15, wherein the route rule includes avoiding at least one map element during a specified event at a venue based on the multiple driver experiences.

21. The system of claim 15, wherein the route rule includes avoiding at least one map element during a weather condition based on the multiple driver experiences.

* * * * *